United States Patent
Hesch

(10) Patent No.: US 6,817,556 B2
(45) Date of Patent: Nov. 16, 2004

(54) METHOD AND APPARATUS FOR SEPARATING USED MATERIALS FROM ONE ANOTHER AND INTO REUSABLE COMPONENTS PARTICULARLY FOR RECYCLING WOOD PRODUCTS, USED FURNITURE, AUTOMOBILE COMPOSITE MATERIAL AND SIMILAR PRODUCTS

(76) Inventor: Rolf Hesch, Steinkamp 2c, D 32657, Lemgo-Löerdissen (DE)

( * ) Notice: Subject to any disclaimer, the term of this patent is extended or adjusted under 35 U.S.C. 154(b) by 0 days.

(21) Appl. No.: 10/128,499

(22) Filed: Apr. 24, 2002

(65) Prior Publication Data

US 2002/0170989 A1 Nov. 21, 2002

(30) Foreign Application Priority Data

May 19, 2001 (DE) .......................................... 101 24 717

(51) Int. Cl.[7] .............................. B02C 23/38; D21C 3/00

(52) U.S. Cl. ........................... 241/19; 241/24.2; 162/91

(58) Field of Search ........................... 241/19, 21, 24.2, 241/24.13, 24.14, DIG. 80, 80, 29, 20, 23, 24.12, 95; 162/91, 1, 10, 13, 147, 150, 165, 166, 189

(56) References Cited

U.S. PATENT DOCUMENTS

| | | | | |
|---|---|---|---|---|
| 2,947,655 A | * | 8/1960 | Eberhardt | 162/26 |
| 3,086,717 A | * | 4/1963 | Vroom et al. | 241/24.2 |
| 4,572,440 A | * | 2/1986 | Tao | 241/23 |
| 4,867,383 A | * | 9/1989 | Terry et al. | 241/24.21 |
| 5,390,860 A | * | 2/1995 | Ali et al. | 241/20 |
| 5,804,035 A | | 9/1998 | Michanickl et al. | 241/19 |
| 5,908,164 A | * | 6/1999 | Robinson et al. | 241/19 |
| 6,260,777 B1 | * | 7/2001 | Seppanen | 241/19 |
| 6,435,433 B1 | | 8/2002 | Hesch | 241/186.35 |

FOREIGN PATENT DOCUMENTS

| | | |
|---|---|---|
| DE | 1 201 045 | 4/1963 |
| DE | 195 09 152 A1 | 3/1995 |
| EP | 0 581 039 B1 | 7/1993 |

* cited by examiner

*Primary Examiner*—Allen Ostrager
*Assistant Examiner*—Jimmy Nguyen
(74) *Attorney, Agent, or Firm*—Rabin & Berdo, P.C.

(57) ABSTRACT

A method for breaking down used materials or items, particularly wooden or motor-vehicle items, into reusable components with the use of fractionating tools, with which the accelerated parts of used material interact. The breakdown is effected selectively through impacts, deformation tension, bending stress, friction and/or shearing, with the shape and arrangement of the fractionating tools being set and/or matched to the structure and size of the used feed materials and/or the obtained recycled material.

15 Claims, 1 Drawing Sheet

METHOD AND APPARATUS FOR SEPARATING USED MATERIALS FROM ONE ANOTHER AND INTO REUSABLE COMPONENTS PARTICULARLY FOR RECYCLING WOOD PRODUCTS, USED FURNITURE, AUTOMOBILE COMPOSITE MATERIAL AND SIMILAR PRODUCTS

BACKGROUND OF THE INVENTION

The invention relates to a method and an apparatus for separating wood products, particularly chips and composite fiber materials, used furniture, automobile composite materials, etc., into reusable individual components, such as chips and fiber bundles, fibers, granulates, powders and the like. The method according to the invention and the associated apparatus are intended to extensively maintain the slenderness ratio (the ratio of length to diameter) of the chips, fiber bundles and fibers without perceptible shortening. The slenderness ratio is a significant prerequisite for high stability values and a well-closed surface of new materials and composite materials produced from the old ones.

PRIOR ART

Numerous methods for recycling the aforementioned materials are known. They represent solutions that are cost-effective to some extent, but have a considerable negative impact on the slenderness ratio. The methods range to granulating the materials, which typically results in a low-quality recycled product. Other methods are suitable for maintaining a high slenderness ratio, but are cost- and labor-intensive. These methods also have a limited throughput, which also negatively influences the associated costs. There are still no suitable reprocessing methods for some used products, however, which leaves only thermal disposal.

The simplest solution, albeit one that has a strong negative impact on the slenderness ratio, is to mechanically comminute the aforementioned materials in a shredder or a hammermill. Shredders can have a single- or two-stage design. Shredders are modified hammermills having a horizontal or vertical intake and tools of various shapes, with or without a grinding track as a counterpart to the hammer mechanism, and with or without the stationary screen or grate part that surrounds the grinding space. The product generated with this system tends to possess the quality of a granulate or filler.

The quality of wood products that are re-processed with the above-described shredder systems can be greatly improved if the feed material is wetted in order to reduce its brittleness. This measure results in fewer small particles and less breakage transversely to the fiber axis. Shredders, hammermills and similar machines are, however, relatively sensitive to moisture. The throughput decreases progressively as the humidity level rises. Jamming begins to occur when the material is between 30 and 40% absolutely dry. For polymer-containing composite materials, moistening and jamming are usually not issues, because these materials can absorb little or no moisture.

Much better results are attained, at least with wood products, when, in accordance with DE 195 09 152, the aforementioned materials are pre-comminuted to have edge lengths of 10–20 cm, then impregnated with a saturating and impregnating solution and, finally, subjected to a steam temperature of 80 to 100 degrees C° in an autoclave for a lengthy reaction time. The impregnating solutions used here are formulated to exert a hydrolyzing effect on the glued joints, so the chips of a particle board, for example, separate from one another due to the hydrolyzing of the glued joints, on the one hand, and the pressure caused by swelling, on the other hand. They can subsequently be separated from one another through screens or the like, and fractionated. The result is a superior recycled chip with an extensively non-reduced slenderness ratio.

The method is relatively costly, however. It requires hydrolyzing chemicals. To accelerate the penetration of these chemicals into the pre-comminuted material, a vacuum must be created in a pressure tank. Finally, steam must be introduced into the pressure tank at a pressure of up to two bar.

The output of this batch-wise operation is low; a comparison of the total investment and the operating costs to the throughput reveals that the product is very good, but the costs are too high.

AS 1 201 045 is analogous in some ways to DE 195 09 152. Here, however, no chemicals are used; instead, a steam pressure of up to five bar is applied. After a reaction time of several hours, chip materials break down into individual components and can be separated from one another through screening.

EP 0 581 039 discloses a further method, which likewise operates on the basis of steam decomposition. Board-type elements and used furniture with or without laminates are broken down into large pieces so they can fit into the pressure chamber of an autoclave. Then, the autoclave is filled with steam in a temperature range between 120 and 180°. At the same time, binding agents that can be hydrolyzed are hydrolyzed, and the chips swell, resulting in the dissolution of the particle-board composite. In contrast to the above-cited publications, in this case, the chip material is subsequently cleaned with a cleaning fluid of hydrolysis products. The necessity of using chemicals that promote hydrolysis, or cleaning fluids, but especially the necessity of using an autoclave with steam in a pressure range between two and five bar, makes the above-described methods costly.

OBJECT OF THE INVENTION

It is the object of the present invention to provide a method and the associated, necessary production system for obtaining a recycled product, the product having good slenderness ratios, at low cost and with a purely mechanical, continuous production procedure that does not employ chemicals, an autoclave, cleaning fluid or live steam. Above all, the method and apparatus according to the invention are intended to be applicable not only to wood products and used furniture, but also to materials and composite materials with high polymer and duromer contents, which cannot be brought into a state in which they can be more easily broken down with the application of moisture.

DETAILED DESCRIPTION OF THE EXEMPLARY EMBODIMENT

Figure 1:
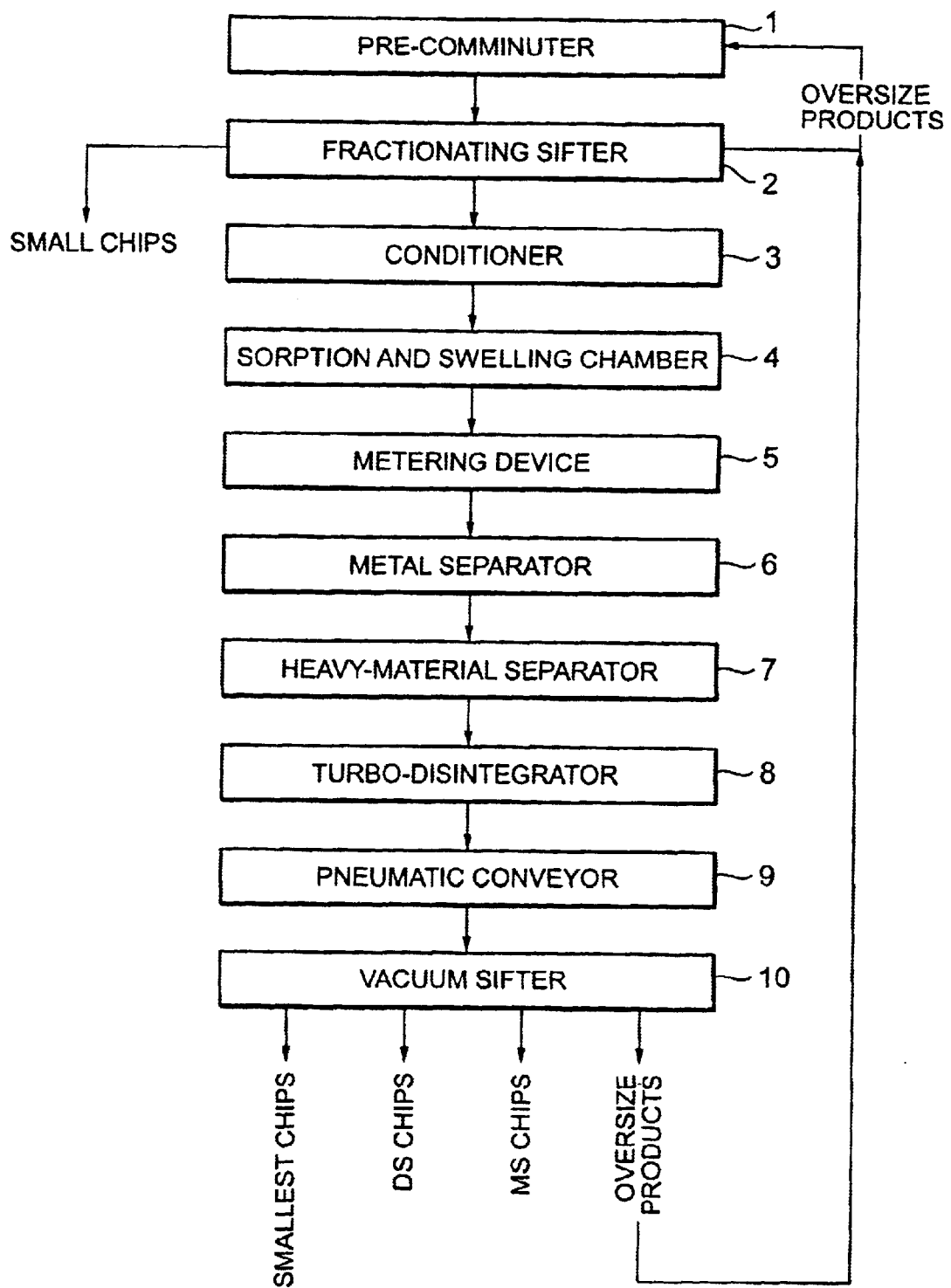
FIG. 1 is a flow chart describing and illustrating the processes and flow of operations performed according to the present invention.

FIG. 1 illustrates the underlying principle of the method according to the invention, with its advantageous embodiments:

The particle board feed product is placed into a pre-comminuter (1) and broken down into fragments having edge lengths of 10×10 to 100×100 mm, preferably 20 mm. The fragments are not necessarily square or rectangular, but have any irregular shape in this size range.

Preferred pre-comminuters are machines that effect numerous cracks and hairline fractures in the fragments, in which capillary forces can develop for the later introduction of moisture, provided that the materials are capable of swelling. Both low-speed machines, such as those that operate according to the shearing-rotor principle, as well as high-speed machines, such as hammermills and shredders, can be implemented in embodiments that promote the formation of cracks and hairline fractures. Tests have revealed that large quantities of chips and fiber bundles having good slenderness ratios (i.e., length to cross-sectional height) are separated out of the composite in the pre-comminution process.

Because the material to be recycled for the ultimate decomposition may, in many cases, be wetted to promote sorption and swelling, it is advisable to separate the chips and fiber bundles that already have a satisfactory geometry out of the material flow using a fractionating sifter (2). Depending on the requirements on the end product, the fractionating sifter can comprise a single screen, or be a combination of a screen/drum screen and a pneumatic sifter. The small chips are supplied to, for example, the SL (surface layer)line. At this point, oversize chips can also be separated out, for example, for CL (core layer) purposes. The fractionating sifter (2) is advantageous for avoiding wetting these fractions, which are already usable, and would require further energy for drying.

In a downstream conditioner (3), the pre-comminuted material, which corresponds to the defined size, is wetted. The wetting can be effected with water, but also with steam or atmospheric live steam. In the use of water, additives that promote wetting may be used in the method according to the invention to accelerate the swelling effect of the water on the wood, and on the binding agent. This type of additive can be used with atmospheric steam, but is not absolutely necessary, because hot moisture naturally greatly accelerates the swelling of wood, as well as the swelling and dissolution of non-moisture-resistant binding agents. In particle-board and MDF (medium density fiberboard) systems, drying gases are an efficient source of atmospheric steam, with virtually 100% water saturation and a temperature of about or just under 100° C.

The bulk material that has been intensively treated with moisture, and possibly with heat, in the conditioner is placed in a sorption and swelling chamber (4). The size of the sorption and swelling chamber depends on the necessary throughput quantity, and the speed of the sorption and swelling that can be attained with the type of moisture supply. If atmospheric steam is used, a lower volume is necessary, because the bulk material swells faster and loses the solidity of its composite structure under the influence of heat. Push- or pull-floor silos are particularly considered as sorption and swelling chambers, as are traveling-spiral or rotating-spiral silos, all of which operate according to the "first in, first out" principle. As the bulk material travels through the silo or the large pile [heap], it has time to adsorb the moisture at the secondary valences of the micelles, and to swell. Moreover, the deformation tensions of the chips that have been dried into the material are released through the supply of moisture, which also contributes to the separation of the material due to the spring back effect. Finally, the moisture, possibly supported by heat, causes the conventionally used glues, which predominantly have a limited resistance to moisture, to dissolve and likewise swell, which gradually leads to the weakening and the breakup of the composite material.

The use of a drying exhaust-gas/steam method offers two advantages: First, the hot exhaust air, which is saturated with water, is put to good use. In a normal scenario, the drying exhaust air is released into the environment after having been appropriately purified, without the heat content being utilized. When the air is used according to the invention, the sorption/swelling is considerably accelerated by the moisture and heat contained therein. The sorption and swelling chamber (4) can also be embodied to purify the drying exhaust gases in the manner of a gravel-bed filter: The drying exhaust gases are conveyed through a sufficiently thick layer of the bulk material in a counter-flow method. In this instance, the drying gases not only impart a sizeable proportion of their moisture and heat to the bulk material, but the fine material contained in the exhaust gases is also filtered in the bulk material, which purifies the exhaust gas. This effect is advantageously present when the fine material in the exhaust gases, which was produced in the pre-comminuter (1) prior to the supply of moisture, has been screened out by the fractionating sifter (2) for reducing the flow resistance in the bulk material.

The softened, swollen bulk material is conveyed from the sorption and swelling chamber (4) to a metering device (5) with the aid of known extraction devices. A volumetric system is a preferred metering device because, unlike gravimetric systems, it only reacts slightly to moisture fluctuations in the moisture range in which the system of the device is operated.

The bulk material is then guided across a metal separator (6), which can be located between position (1) and position (2).

For also separating out non-ferritic foreign bodies, a heavy-material separator (7) is disposed in front of a turbo disintegrator (8); it can be embodied in accordance with EP 1 035 237 A2, or in other ways.

The above description only presents one example of the numerous options of preparing for and performing the actual breakdown process. Particularly in materials and composite materials that contain wood cellulose or other lignocelluloses, or other components that are generally capable of swelling, an advance swelling process greatly facilitates the breakdown procedure, and reduces the material damage during the breakdown procedure. In accordance with the invention, agents are also used to promote swelling and reduce the stability of glued joints; these agents facilitate the wetting of the material with swelling agents, while biological agents such as bacterial cultures of microorganisms are employed for weakening the composite structure. The use of microorganisms is particularly practical in large, outdoor piles with push- or pull-floor extraction, or with power shovels; on the one hand, this assures the time required for the microorganism activity, and on the other hand, it allows rainfall to be utilized in maintaining the moisture content of the material to be broken down. Of course, such piles must be sealed to protect the groundwater below. Pumps convey excess liquid from above to the fresh material placed on top of the heap for the purpose of saturating it.

For materials containing wood cellulose and similar lignocelluloses, a further interesting option is to moisten the material intensively in a washing facility, as is standard practice in the MDF industry, for example. The washing procedure required for MDF is omitted here, because it is not necessary. A washing facility of this type is certainly capable of separating out heavy components having a higher density than water, thus rendering magnet separators and heavy-material separators superfluous. With the aid of this washing facility, which performs the function of an intensive wetting and saturation facility in the ensuing description, the capillary system created in the pre-comminution process can be enriched particularly rapidly with liquid. This is all the more the case when warm or hot water is used. There is no formation of waste water to be disposed of, because the dripping water is either returned to the wetting facility via corresponding de-watering conveyors, or applied to the fresh pre-comminuted material and used in further swelling processes. Thus, the method creates no issues with respect to groundwater or the environment.

As already mentioned, the above description only relates to materials that can swell, and composite structures created from them. If the material to be reused is predominantly or completely composed of polymer or duromer components, moisture and swelling typically accomplish very little, or nothing. Thus, these preparatory measures are not implemented.

In all cases, whether or not moisture can be employed in a pre-treatment, the actual breakdown process into individual chips, fiber bundles, fibers, granulates, powders or the like takes place in a turbo-disintegrator (8).

From the turbo-disintegrator (8), a pneumatic conveyor (9) conveys the broken-down material into a vacuum sifter (10). The primary function of the vacuum sifter is to separate the recyclable material out of the material stream. Because the material flies through the vacuum sifter in a flight parabola, pneumatic sifting occurs in the sense of a cross-flow sifter. Depending on the respective mass and kinetic energy, on the one hand, and the specific surface of the individual fragments, on the other, the material can be sifted into a selectable number of fractions, such as smallest chips, DS chips, MS chips and oversize products. The oversize products can be supplied to the pre-comminution device (1) and subsequently comminuted.

The above-described measures are preparatory steps of the method in its different variations, depending on the used material to be prepared. The preparatory steps are particularly significant if good slenderness ratios are sought for used materials that are capable of swelling.

The actual breakdown in the turbo-disintegrator (8) is effected according to a fundamental operating principle involving the interaction of rotors that preferably rotate in opposite directions with a very high energy intake, which becomes effective as impacts, deformation stress, bending stress, friction and shearing in different zones and planes of the material to be broken down, depending on the type and arrangement of the tools. To characterize the order of magnitude of the energy intake, the example presented here is a machine having an inside-rotor diameter of, for example, 1410 mm, with the tools of the oppositely-rotating rotor having a flight radius of, for example, 1410 mm at both rotors, the machine being motorized with motors running at 100 to 300 kW, preferably 200 kW. A machine of this size generates a sound level between 90 and 130 dB (A), depending on the rpm. The rpm range of the inside rotor is generally between 500 and 2000, while that of the outside rotor is between 0 and 2000, preferably about 1200.

The type and position of the fractionating tools in the outside rotor are critical. The arrangement is always selected to prevent jamming; flammable materials would catch fire and melt polymer materials, which would jam the machine. The shape and arrangement of the tools must reliably assure the extraction of the broken-down material. The spacing between the tools must meet the basic prerequisite that no material can build up on the tools. This is primarily an issue of adequate spacing and the generation of sufficiently high centrifugal forces to ensure that the material is thrown off.

Because the method and the apparatus of the invention can be implemented for a number of used products, an inventive feature of the method and apparatus is that the fractionating tools of the outside rotor are embodied in diverse manners, and are purposefully adapted to the material to be processed and the desired recycled product.

The different functions of one and the same tool are illustrated by way of a concrete example that has been subjected to a lengthy series of tests:

If the fractionating tool of the outside rotor comprises, for example, a flatiron bar with a 15-mm thickness and a 50-mm width, this tool can achieve widely-varying results. If the tool is mounted such that material to be separated into its components is thrown from the inside rotor against the narrow tool edge, the thrown material is stressed to the point of bending. Consequently, shearing forces develop in the material layers, causing, for example, chips of a particle board to be subjected to a bending stress, causing them to separate from one another. The length of the chips is hardly reduced, especially if adequate swelling has taken place. If, however, the same tool is mounted in the outside rotor such that the feed material is not thrown against the narrow side of the tool, but against its wide side, no bending stress occurs; instead, an impact stress is preferably effected. In this case, a far more intensive separation effect takes place than with the narrow tool side in the described example. Not only do the original chips separate from one another, but the extreme impact stress breaks down at least the larger chips into a different number of partial chips, that is, in addition to the breakdown of the composite structure, the individual chips are broken down into a plurality of smaller chips. In an extreme case, this tool position can effect the destruction of a material that could not occur in an impact against the narrow edge.

In the use of the aforementioned flat iron bar, the function can be modified within broad parameters in that the narrow side possesses radii of different sizes, up to a knife-like blade. A large radius results in a gentle breakdown, while a blade-like radius more likely leads to an extreme bending stress, followed by the formation of cracks transversely to the fiber axis of the chip or the like, than to shearing stresses that effect the breakdown of the composite structure and attain advantageous slenderness ratios.

If, for example, the material is a piece of vehicle interior trim preferably comprising polymer fibers, or a mixture of polymer fibers and natural fibers, the above-described tools resembling flat iron bars are inadequate for an advantageous comminution. These molded parts have essentially obtained their cohesion from thermobonding, that is, the polymer fibers were melted together at their points of intersection. Surprisingly, over the course of development efforts, it was found that apparently homogeneously-melted zones of such molded parts actually maintain their fiber structure, although it is not readily visible. With a higher density, however, the melted areas are so strong that a pure impact only effects an inadequate breakdown into individual parts or individual fibers. A combination of bending stress, impacts and tension or cracking stress is required for creating not an amorphous mass, but a fibrous material, from the material to be processed, which is particularly an objective with natural fibers. The combination of the operating principles outlined above is achieved through the embodiment of the tools. In the use of the aforementioned flat iron bar as an impact tool for the present intended application the tool may be embodied as a comb tool, with the ends of the inside rotor also advantageously being embodied as a comb tool. Impact and bending stresses can occur simultaneously at these double-sided comb tools. Because the ends mesh with one another, however, parts that have not been broken down sufficiently due to impacts and bending are subjected to tensile stress between the rotating combs, causing the fibers to be pulled apart. It has been seen that border zones of reduced stability, where the fibers slide against one another, remain even between polymer fibers that appear to have melted together.

The comb tools of the two rotors can be oriented strictly radially, and mesh in this position. It is also possible, however, to set the two combs in a more tangential arrangement relative to the two rotors, and embody their front surfaces to be sharpened to a sawtooth-like or blade-like structure. Tools embodied in this manner perform a certain cutting action, in addition to impact and shearing actions, for executing a cutting breakdown process in addition to impacts and bending and tensile stresses for materials that are particularly difficult to break down.

The comb tools can be embodied as rectangular combs, roof-shaped combs, prismatic combs and the like.

If the desired geometry of the final product or the requirements of the feed product dictates that friction and shearing are to be implemented as the operating principle, alone or in combination with the above-described principles, knife-like flat iron bars can be mounted closely together in the outside rotor, so the inside rotor pushes away the feed material past the tools of the outside rotor, thereby initiating a frictional or shearing stress. This arrangement of the tools of the outside rotor differs from a conventional frictional track or grinding track in that adequate spaces for allowing the comminuted material to pass between the tools without jamming are provided between the tools in accordance with the invention. In a further embodiment, the tool of the outside ring can also comprise a stamped, perforated steel sheet, in which case the edges of the perforated steel sheet, which extend counter to the direction of movement of the inside rotor, act as impact, friction and/or shearing edges. This effect can be enhanced in the direction of the shearing and impact forces by standing the transverse supports of the perforated steel sheet on edge relative to the inside rotor, or setting them. Development efforts have revealed that, in addition to the function of the turbo-disintegrator, with its dual-rotor system and high energy intake, the embodiment of the tools figures decisively into the option for converting waste products back into usable materials, and configuring their geometry in the desired form.

What is claimed is:

1. A method for separating at least one of chips, fibers, and fiber bundles, having a selected slenderness ratio, from a used material that is one of a wood product, used furniture, automobile composite material, and a product containing at least one of polymer and duromer, comprising:
    subjecting the used material to a pre-treatment operation to break down the used material into a plurality of fragments;
    fractionating the fragments of used material to separate fragments having a selected size from fragments not having the selected size, at least some of the fragments having the selected size being comprised of the at least one of the chips, fibers and fiber bundles;
    subjecting the fragments having the selected size to a further pre-treatment operation to cause the fragments to swell, thereby causing binding forces within the fragments to weaken, the further pre-treatment including at least one of:
    wetting the fragments having the selected size;
    saturating the fragments having the selected size;
    subjecting the fragments having the selected size to vapor;
    heating the fragments having the selected size; and
    adding at least one of chemical and biological agents to the fragments having the selected size, to at least one of promote and accelerate a swelling effect of the fragments having the selected size, by reducing a stability of a binding agent used to hold together the at least one of the chips, fibers and fiber bundles of the at least some of the fragments having the selected size;
    after the further pre-treatment operation, placing the fragments having the selected size into a sorption and swelling chamber for a selected reaction time, until the binding forces within the fragments have been reduced to a selected level; and
    feeding the fragments from the sorption and swelling chamber to fractionating tools, which impact and accelerate the fragments, subjecting the fragments to at least one of deformation tension, bending stresses, tensile stress, friction and shearing, thereby separating the fragments into the at feast one of the chips, fibers and fiber bundles having the selected slenderness ratio, with the fractionating tools being oriented and shaped to match a structure and size of at least one of the fragments and a recycled material to be obtained.

2. The method according to claim 1, wherein said further pre-treatment includes performing at least one of the wetting, the saturating and the subjecting, and further includes the heating.

3. The method according to claim 2, wherein said further pre-treatment further includes the adding.

4. The method according to claim 1, wherein said further pre-treatment includes performing at least one of the wetting, the saturating and the subjecting, and further includes the adding.

5. The method according to claim 4, wherein said further pre-treatment further includes the heating.

6. The method according to claim 1, wherein the sorption and swelling chamber is an open storage space.

7. The method according to claim 1, wherein the separating includes a pneumatic or mechanical sifting, to separate the conveyed stream of material into different fractions.

8. The method according to claim 1, wherein the fractionating tools are disposed on an outside rotor that rotates relative and coaxially to an inside rotor, which serves to accelerate the fragments.

9. The method according to claim 8, further comprising rotating the rotors up to 2000 revolutions per minute.

10. The method according to claim 8, wherein the rotors have a diameter up to two meters; further comprising driving the rotors with a power of up to 300 kW each.

11. The method according to claim 1, wherein the fractionating tools include flat iron bars.

12. The method according to claim 11, wherein the flat iron bars are configured as comb tools.

13. The method according to claim 1, wherein the sorption and swelling chamber is a vertical silo such as a push-or-pull floor silo or a rotating spiral silo.

14. The method according to claim 1, wherein the sorption and swelling chamber is used to purify the drying exhaust gases by conveying them through the bulk material in a counter flow method, which purifies the exhaust gas.

15. The method according to claim 1, wherein the vapor is the exhaust gases of dryers.

* * * * *